US010675726B2

(12) United States Patent
Hirata et al.

(10) Patent No.: US 10,675,726 B2
(45) Date of Patent: Jun. 9, 2020

(54) PROCESSING MACHINE BASE CONSTRUCTION AND BASE SETTING METHOD FOR CONFIGURING A PROCESSING MACHINE LINE (71) Applicant: FUJI CORPORATION, Chiryu-shi (JP)

(72) Inventors: Shuichi Hirata, Toyota (JP); Daisuke Fukuoka, Toyota (JP)

(73) Assignee: FUJI CORPORATION, Chiryu-shi (JP)

( * ) Notice: Subject to any disclaimer, the term of this patent is extended or adjusted under 35 U.S.C. 154(b) by 228 days.

(21) Appl. No.: 15/517,980

(22) PCT Filed: Oct. 17, 2014

(86) PCT No.: PCT/JP2014/077683
§ 371 (c)(1),
(2) Date: Apr. 10, 2017

(87) PCT Pub. No.: WO2016/059718
PCT Pub. Date: Apr. 21, 2016

(65) Prior Publication Data
US 2017/0304979 A1    Oct. 26, 2017

(51) Int. Cl.
*B23Q 41/02*    (2006.01)
*B23Q 7/04*    (2006.01)
(Continued)

(52) U.S. Cl.
CPC .............. *B23Q 41/02* (2013.01); *B23Q 7/04* (2013.01); *B23Q 37/007* (2013.01); *B23Q 39/04* (2013.01)

(58) Field of Classification Search
CPC ........... Y10T 29/49895; Y10T 29/5122; Y10T 29/5124; Y10T 29/5136; Y10T 29/51;
(Continued)

(56) References Cited

U.S. PATENT DOCUMENTS 6,226,848 B1 *   5/2001   Kurtz ................... B23P 21/004
                                              29/407.01
6,299,392 B1 *  10/2001   Swanson .............. B23P 21/004
                                              269/309
(Continued)

FOREIGN PATENT DOCUMENTS

DE    2527829 A1    1/1977
JP    2-197119 A    8/1990
(Continued)

OTHER PUBLICATIONS

International Search Report dated Dec. 9, 2014, in PCT/JP2014/077683, filed Oct. 17, 2014.

*Primary Examiner* — Sarang Afzali
*Assistant Examiner* — Darrell C Ford
(74) *Attorney, Agent, or Firm* — Oblon, McClelland, Maier & Neustadt, L.L.P.

(57) ABSTRACT

A base configuration of a processing machine line including a machine tool loaded on a base provided with a processing module that performs specified processing on a work, and an auto loader that transfers the work between processing modules, the base being configured such that a rail member of the auto loader that has a length to match the width of the base is assembled on a front section of the base, and, when multiple bases are arranged next to each other in an adjacent position at which rail members can be connected, an additional rail member is able to be attached to and removed from an additional base.

6 Claims, 8 Drawing Sheets (51) Int. Cl.
  *B23Q 39/04* (2006.01)
  *B23Q 37/00* (2006.01)

(58) Field of Classification Search
  CPC ........ B23Q 41/02; B23Q 7/04; B23Q 37/007; B23Q 39/04
  USPC .......................... 29/33 R, 464, 561, 563, 564
  See application file for complete search history.

(56) References Cited

U.S. PATENT DOCUMENTS

| | | | | |
|---|---|---|---|---|
| 8,584,349 | B2* | 11/2013 | Scannon | G05B 19/4188 |
| | | | | 29/722 |
| 10,226,847 | B2* | 3/2019 | Asakawa | B23P 23/00 |
| 10,246,208 | B2* | 4/2019 | Baskin | B23P 19/04 |
| 2001/0053324 | A1 | 12/2001 | Saeki et al. | |
| 2002/0092193 | A1* | 7/2002 | DeCecca | B23Q 7/1426 |
| | | | | 33/613 |
| 2004/0050668 | A1* | 3/2004 | Bowlin | F16M 1/00 |
| | | | | 198/576 |
| 2006/0048379 | A1* | 3/2006 | Onobori | H05K 13/0061 |
| | | | | 29/832 |
| 2006/0104751 | A1* | 5/2006 | Arai | B23Q 1/0054 |
| | | | | 414/222.01 |
| 2006/0150394 | A1* | 7/2006 | Mogck | B62D 65/18 |
| | | | | 29/564.1 |
| 2008/0040917 | A1* | 2/2008 | Narita | H01L 21/67132 |
| | | | | 29/740 |
| 2008/0169169 | A1* | 7/2008 | Huebner | B23P 21/004 |
| | | | | 198/345.3 |
| 2009/0151148 | A1* | 6/2009 | Reinisch | B23P 21/004 |
| | | | | 29/564.1 |
| 2013/0232779 | A1* | 9/2013 | Mori | B23Q 7/04 |
| | | | | 29/791 |
| 2013/0299039 | A1* | 11/2013 | DePaulis | B23P 23/00 |
| | | | | 140/123 |
| 2015/0128403 | A1* | 5/2015 | Valkama | B66B 19/002 |
| | | | | 29/464 |

FOREIGN PATENT DOCUMENTS

| | | |
|---|---|---|
| JP | 5-318265 A | 12/1993 |
| JP | 7-1298 A | 1/1995 |
| JP | 2001-345365 A | 12/2001 |
| JP | 2009-12135 A | 1/2009 |
| JP | 2011-77334 A | 4/2011 |
| JP | 2011-110622 A | 6/2011 |

* cited by examiner

PROCESSING MACHINE BASE CONSTRUCTION AND BASE SETTING METHOD FOR CONFIGURING A PROCESSING MACHINE LINE

TECHNICAL FIELD

The present application relates to a processing machine line configured from multiple processing modules and provided with an auto loader that performs transfer of work between the processing modules, and in particular relates to a base construction and a setting method of a base for loading the processing modules and the loader.

BACKGROUND ART

In a known processing machine line provided with multiple machine tools lined up that perform a series of processing, an auto loader is loaded for conveying work to each of the machine tools. To be capable of transferring the work between machine tools, the auto loader is movable between respective transfer positions. That is, a traveling rail is provided at the processing machine line corresponding to the multiple machine tools, and the auto loader is configured to be movable along the traveling rail.

CITATION LIST

Patent Literature

Patent literature 1: JP-A-2011-110622

SUMMARY

However, in such a processing machine line, layout changes are performed such as changing the quantity of processing machines or changing the type of processing machines used in accordance with changes to the processing work to be performed. Changes to the layout of the processing machine line also entail a change in the travel distance of the auto loader, and the length of the traveling rail must be adjusted in accordance with this change in the travel distance. In this case, one might consider preparing multiple rail members of different lengths to correspond to the length of the processing machine line. However, preparing multiple rail members of different lengths to correspond to various movement distances leads to problems such as increased costs due to an increased quantity of rail members, and the need for a large storage space to store long rail members.

Thus, with regard to a traveling rail of an auto loader, it is desirable to prepare rail members of a specified length that are able to be connected and disconnected, such that a specified length of traveling rail can be formed by connecting rail members together based on the layout of the processing machine line. The connection construction of such rail members will change according to the processing machine line, thus an issue with the rail member configured as a set with a base as proposed herein is to make the connection work of connecting rail member easier.

Thus, an object of the present disclosure is to solve the above problems and provide a processing machine base construction and base setting method for configuring a processing machine line with good workability.

According to an aspect of the present disclosure, a processing machine base construction includes: a processing module configured to perform specified processing on a work; an auto loader configured to transfer the work between the processing modules, the auto loader being loaded on a base; wherein the base is configured such that a rail member of the auto loader that has a length to match a width of the base is assembled on a front section of the base, and, when the quantity of processing modules is increased, an additional rail member of the auto loader that has a length to match a width of an additional base is able to be attached to and removed from the front section of the additional base that is added next to the base.

According to another aspect of the present disclosure, a base setting method includes: configuring a processing machine line by loading a processing module configured to perform specified processing on a work and an auto loader configured to transfer work between the processing modules on a base; arranging multiple of the bases adjacent in a width direction; attaching a first rail member of the auto loader to a front section of a first base, which is a reference base from among the multiple bases, the first rail member being formed to match a width of the first base; and connecting a second rail member of the auto loader to the first rail member of the auto loader, the second rail member being formed to match a width of a second base, such that when the second base is subsequently arranged adjacent to the first base in the width direction, the second rail member is attached to the second base.

EFFECTS

According to the present disclosure, because the rail member is separated from the base, and work of connecting respective rail members is able to be performed separately from base setting work, it is easy to perform base setting work when configuring a processing machine line.

DESCRIPTION OF EMBODIMENTS

Figure 1:
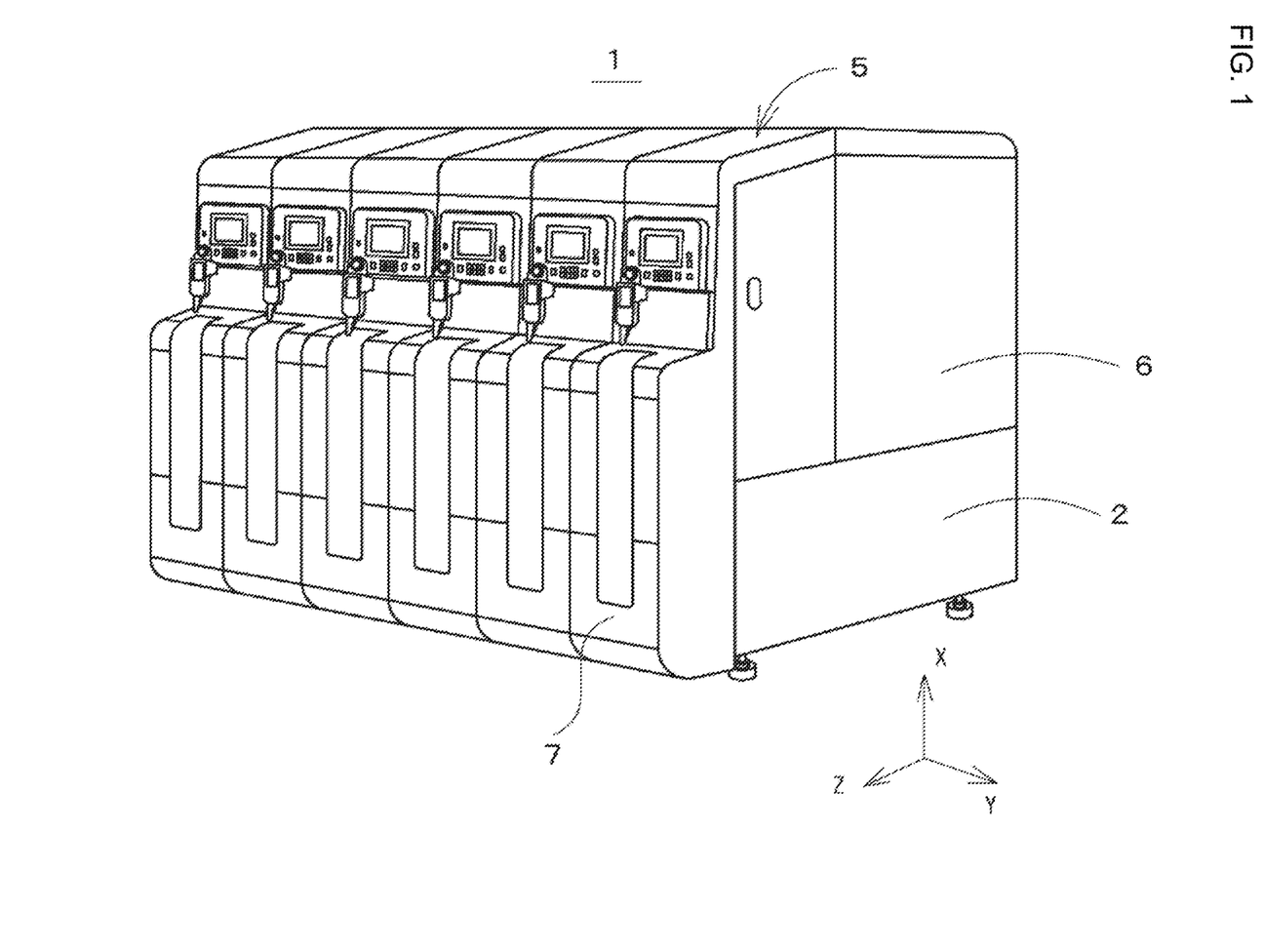
FIG. 1 is a perspective view of an embodiment of a processing machine line.

An embodiment of the processing machine base construction and base setting method for configuring a processing machine line of the present disclosure is described below with reference to the figures. First, FIG. 1 is a perspective view of an embodiment of a processing machine line. Processing machine line 1 has six machine tools 5 loaded on two bases 2 acting as a foundation. Each of the six machine tools 5 is the same type of NC lathe, with the same outer shape and dimensions. Also, processing machine line 1 is provided with an auto loader (automatic conveying robot) configured to perform transfer of work between each of the machine tools 5.

Here, "processing machine line" refers to a group of processing machines in which transfer of work between multiple processing machines such as machine tools is performed by an auto loader, and specified processing is performed on the work by each of the processing machines. As shown in the figures, processing machine line 1 of the present embodiment has six machine tools 5 arranged adjacently in the width direction (Y-axis direction). However, the processing machine line may be configured not only from the same type of machine, but may also include different types of machine tools (lathes, drilling machines, boring machines, milling machines, gear cutting machines, cutting machines, and so on). Further, changing the layout such as by changing the types or quantity based on the processing to be performed may be performed in various patterns.

Figure 2:
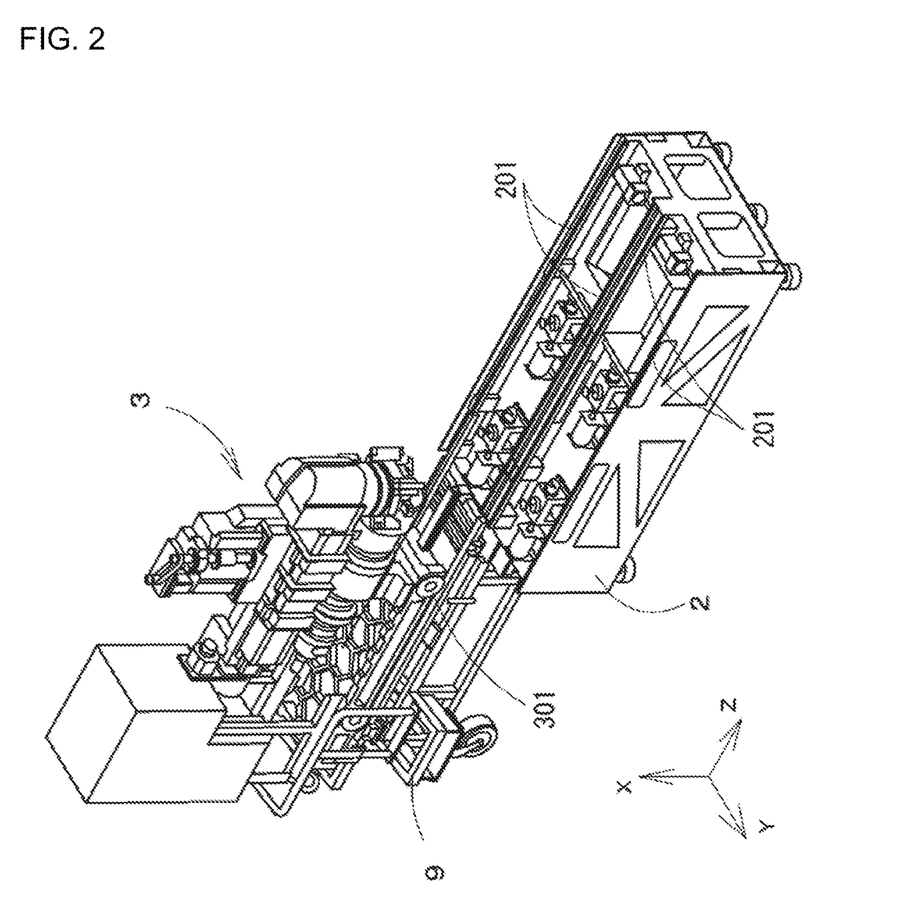
FIG. 2 is a perspective view of a processing module, which is the internal configuration of a machine tool.

FIG. 2 is a perspective view of processing module 3, which is the internal configuration of machine tool 5, with processing module 3 shown loaded on trolley 9 in a state pulled out from the rear of base 2. Machine tool 5 has processing module 3 loaded on base 2, and the processing section of processing module 3 is covered by external cover 6 shown in FIG. 1. Only one processing module 3 is shown in FIG. 2, but two processing modules 3 can be loaded on base 2. Therefore, there are two sets of rails 201 each provided on base 2 to match the width of processing module 3. Processing module 3 has wheels 301 to be loadable on base 2 in a state freely movable on rails 201.

Therefore, processing module 3 is able to move in the lengthwise direction of base 2, that is, the front-rear direction (Z-axis direction) of processing machine line 1. As shown in FIG. 2, processing module 3 is able to be exchanged by being to transferred to trolley 9 arranged at the rear of base 2, and tool exchange and the like may be performed when processing module 3 is pulled forward from base 2. Thus, with processing machine line 1, even with machine tools 5 adjacent as shown in FIG. 1, work such as maintenance can be performed without affecting adjacent machine tools 5. Note that, processing module 3 may be pulled out together with external cover 6.

As shown in FIG. 1, front cover 7 is provided on the front side of processing machine 1 line, that is, on the front side of external cover 6, and auto loader 4 (refer to FIG. 3) is provided inside front cover 7. External cover 6 surrounds each processing module 3 of machine tool 5, such that a closed processing space is formed around each machine tool 5. On the other hand, front cover 7 is provided for each machine tool 5, and the internal section covered by multiple front covers 7 forms one space connected in the Y-axis direction. That is, the configuration is such that auto loader 4 is able to move in one conveyance space in the direction in which machine tools 5 are lined up (Y-axis direction).

Figure 3:
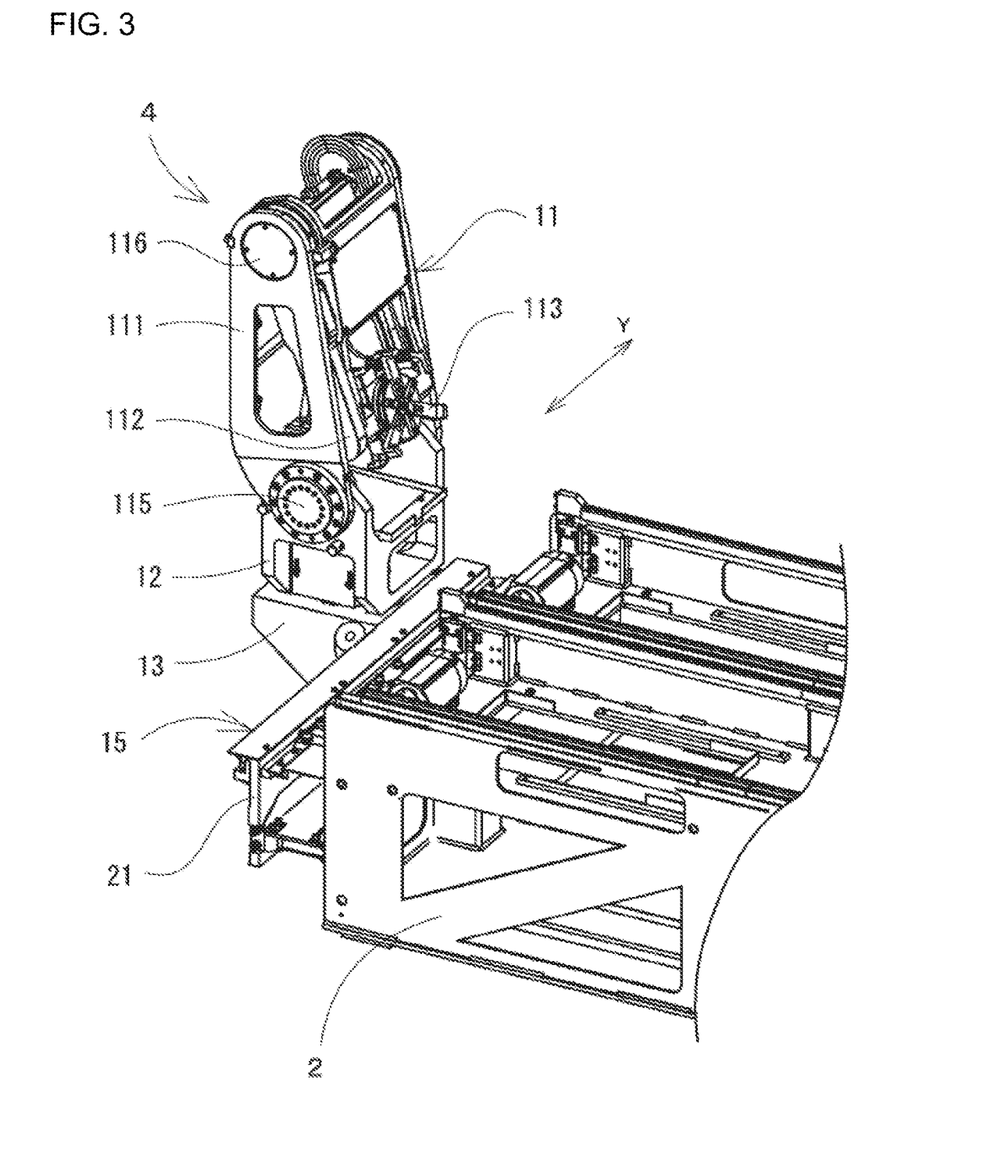
FIG. 3 is a perspective view of an auto loader loaded on a base.
Figure 4:
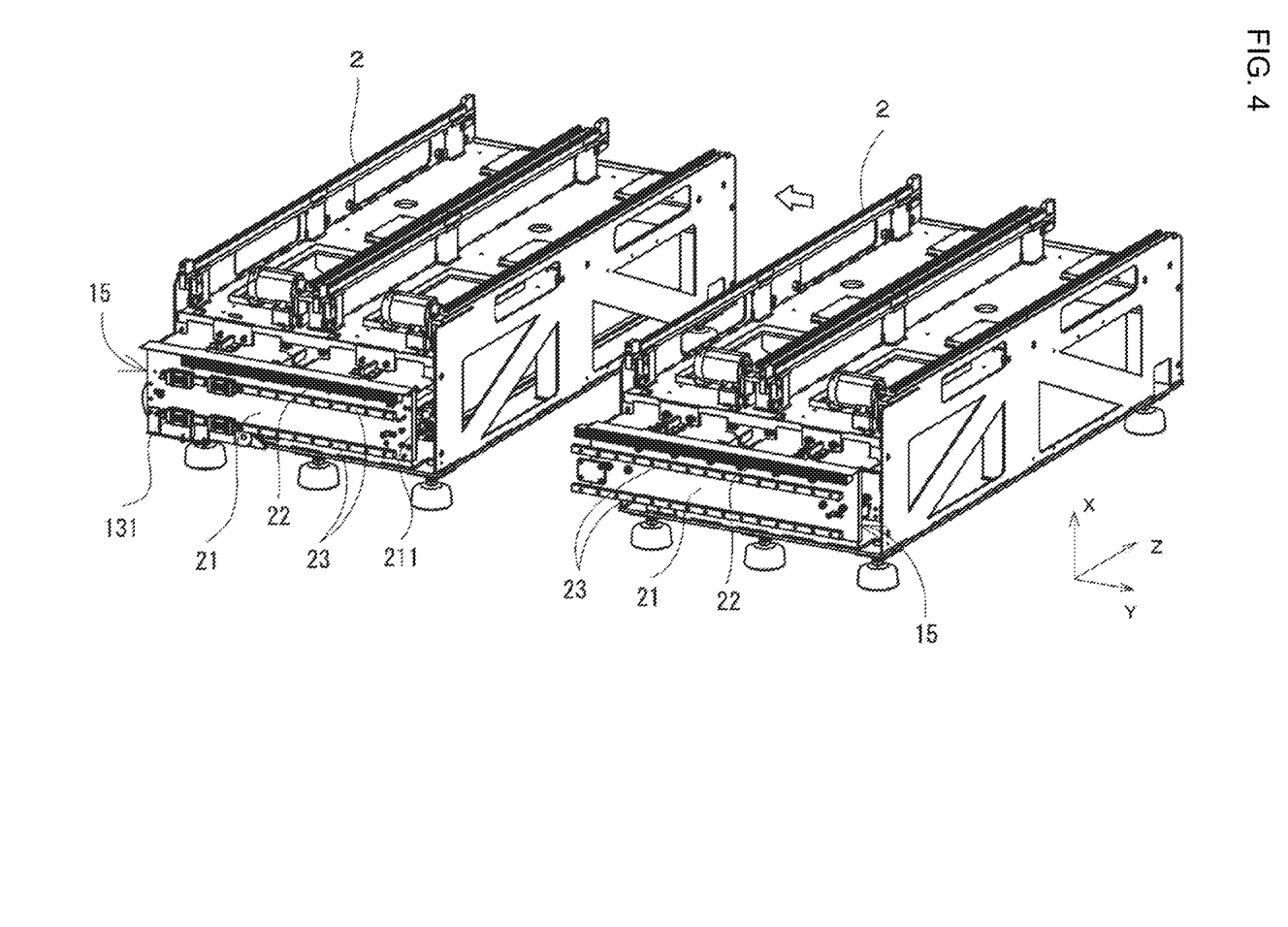
FIG. 4 is a perspective view of two bases of the processing machine line.

FIG. 3 is a perspective view of auto loader 4 provided inside front cover 7, shown in a state loaded on base 2. FIG. 4 is a perspective view of the base configuration of two bases. Each base 2, as described above, is of a size such that two machine tools 5 can be loaded. Thus, the base construction of processing machine line 1 shown in FIG. 1 is configured from three bases 2 with respect to six machine tools 5. For ease of understanding, FIG. 3 shows only the portion of auto loader 4 of processing machine line 1 for one base 2. Also, only two bases are shown in FIG. 4, but another base 2 is provided in processing machine line 1.

Auto loader 4 shown in FIG. 3 is shown in a state with articulated robot arm 11 folded up such that traveling and rotation is possible. Articulated robot arm 11 is configured from upper arm member 111, front arm member 112, and joint mechanisms 115 and 116. Articulated robot arm 11 is able to change between a state shown in the figure in which upper arm member 111 and front arm member 112 are folded up, and an extended state extended to the side at which is located a processing module 3, which is not shown, on the right side of the figure, by joint mechanisms 115 and 116 being driven. Robot hand 113 is provided on an end portion of front arm member 112, such that grasping and releasing of a work is possible. Articulated robot arm 11 is attached to rotation table 12 via joint mechanism 115, and rotation table 12 is loaded on traveling table 13 via a rotation mechanism.

Articulated robot arm 11 is configured to be able to move to a position corresponding to each of the six machine tools 5 by the movement of traveling table 13. Thus, as shown in FIG. 4, rail member 15 is provided on the front section of base 2 for guiding traveling table 13. For rail member 15, plate-like rail support 21 is attached to the front section of base 2, and rack 22 and two travel rails 23 are fixed to rail support 21 lined up in a vertical direction.

On the other hand, with traveling table 13, two travel sliders 131 each (refer to FIG. 4) that slide in a state gripping travel rails 23 are fixed at the top and bottom respectively, and also loaded is a travel motor that applies rotation to a pinion that engages with rack 22. Accordingly, the pinion rolls along the rack due to the driving of the travel motor, and traveling table 13 and articulated robot arm 11 move in the Y-axis direction by the sliding of sliders 131 along travel rails 23.

Because processing machine line 1 is provided in a state with machine tools 5 arranged adjacently, the length of travel rail 23 should be a length of about the total width of arranged base 2. Thus, on each base 2, rail member 15 of a length matching that width dimension is configured integrally, such that handling is performed as one body. That is, as shown in FIG. 4, rail member 15 is fixed to the front section of each base 2, and for assembly of processing machine line 1, connecting rail members 15 to each other is performed in accordance with work to arrange base 2.

However, connecting rail members 15 to each other gives rise to a level difference at the joint between travel rails 23, which obstructs the smooth movement of travel table 13, in some cases travel table 13 catching on travel slider 131 and being unable to move. Thus, while minute position adjustments of travel rails 23 may be required, with a configuration in which rail members 15 are one body with base 2, adjustment work of rail member 15 becomes adjustment work of base 2. Minute adjustment of heavy base 2 is not easy, and with a base construction up this point, the burden on an operator who connects rail members 15 is large, and a long time is required for the work.

Figure 5:
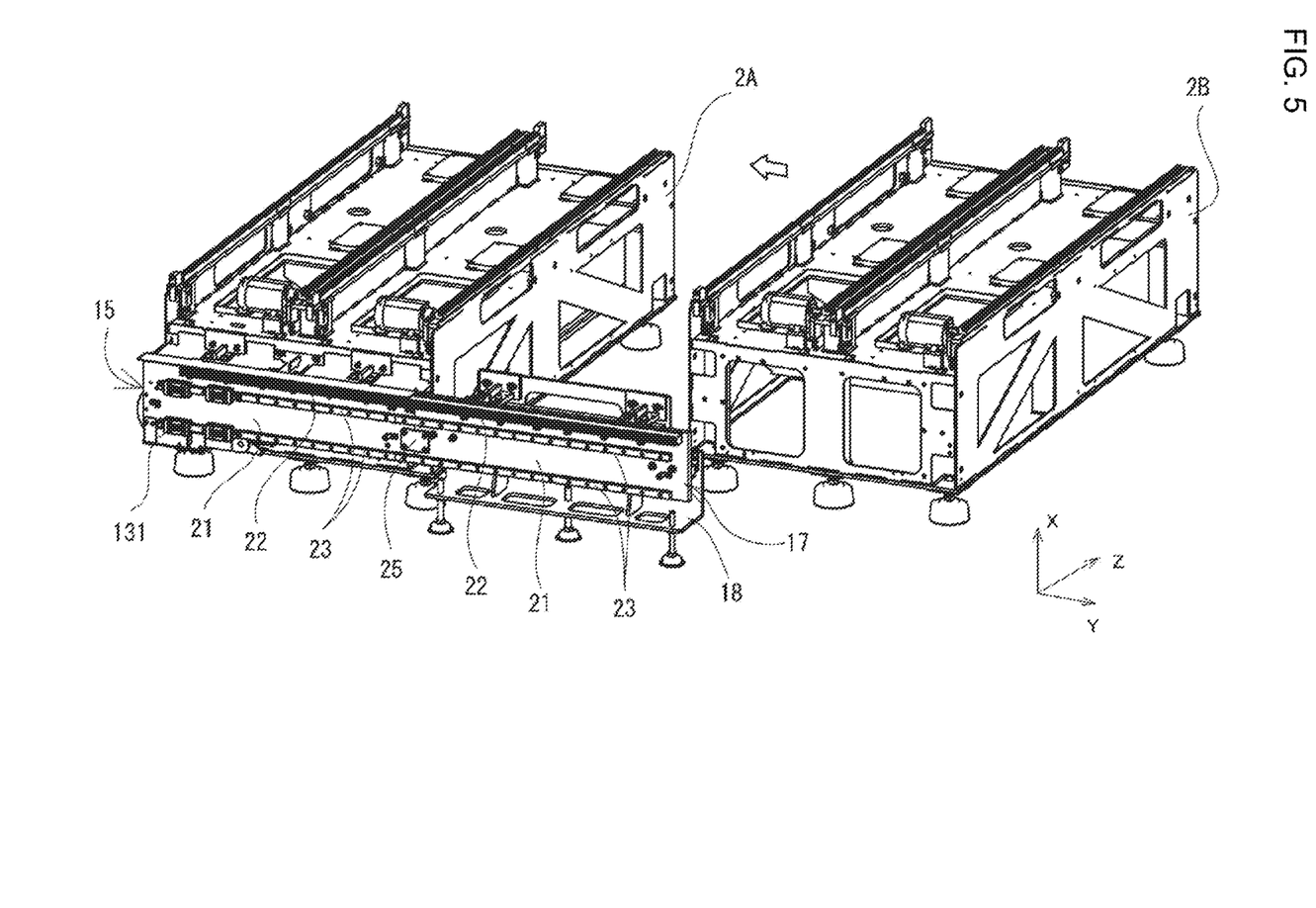
FIG. 5 is a perspective view showing a situation of setting a base in the processing machine line.

Thus, with the present embodiment, a processing machine line base construction and a base setting method outlined below are used. FIG. 5 is a perspective view showing a situation of setting a base to processing machine line 1, the base construction being that of the present embodiment; the same reference signs are used for configuration items the same as those shown in FIG. 4. First, in this embodiment too, one rail member 15 that matches the width of base 2A is provided on base 2A. Additional rail member 17 that matches the width dimension of additional base 2B is assembled to additional base 2B, and the configuration is such that additional rail member 17 is separated from additional base 2B.

In a case such as processing machine line 1 in which multiple bases 2 are arranged, a reference base 2A, as shown in FIG. 4, is provided with rail member 15 fixed integrally to base 2A, whereas additional base 2B and any further additional bases are configured such that additional rail member 17 is assembled to the additional base in a removable manner. Accordingly, with processing machine line 1, one base 2A provided with rail member 15 is used, and two additional bases 2B provided with additional rail member 17 are used. When adding an additional base 2B to already arranged base 2A, as shown in FIG. 5, performed first is connection work of connecting an additional rail member 17 that has been disconnected from additional base 2B.

Figure 6:
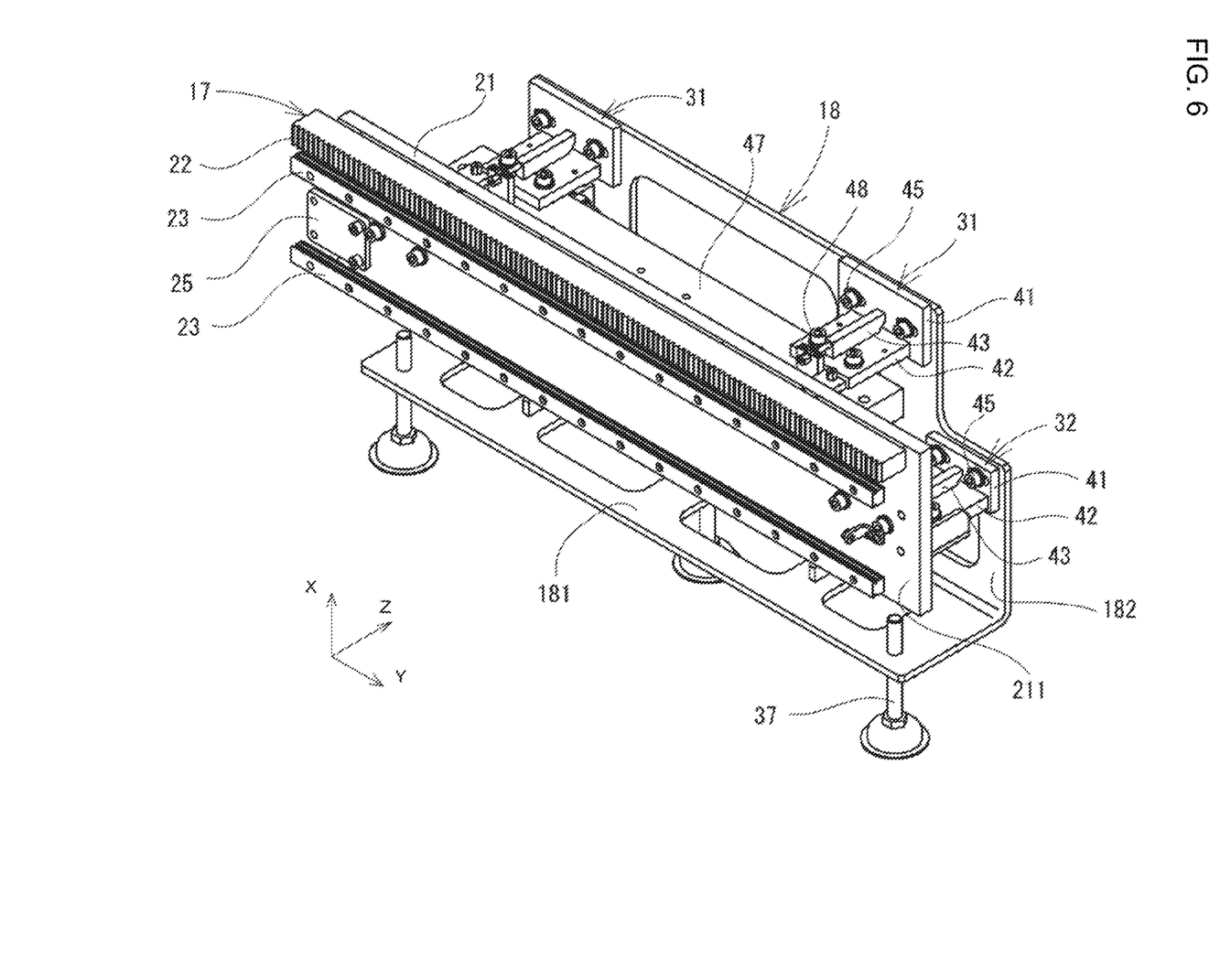
FIG. 6 is a perspective view of an additional rail member and a connecting jig from the front.
Figure 7:
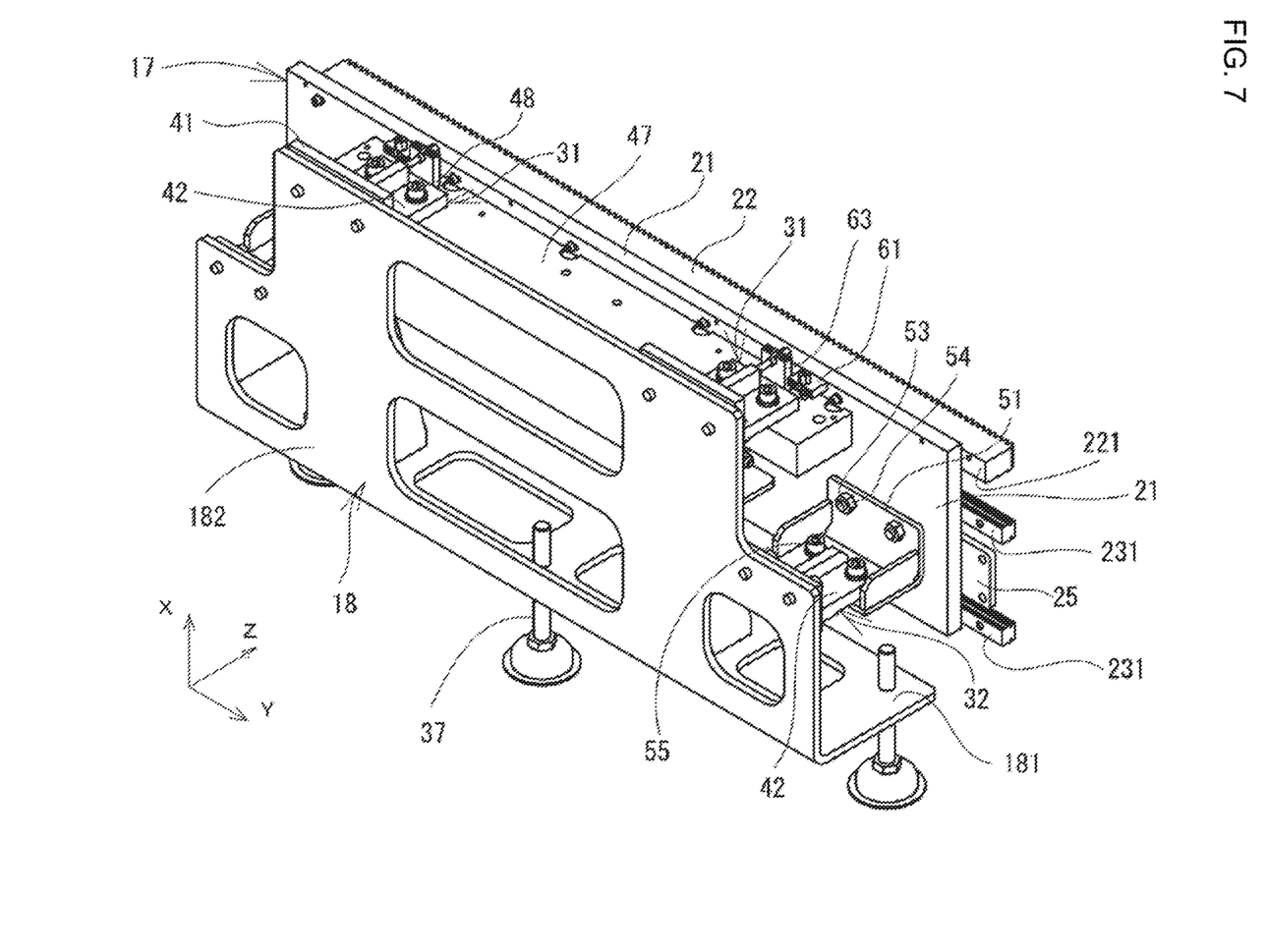
FIG. 7 is a perspective view of the additional rail member and the connecting jig from the rear.

Here, FIGS. 6 and 7 are perspective views showing additional rail member 17 and connecting jig 18 during connection work, FIG. 6 showing a front view from the additional rail member 17 side, and FIG. 7 showing a rear view from the connecting jig 18 side. For additional rail member 17, in a similar manner to rail member 15, rack 22 and two travel rails 23 extending in a lengthwise direction are fixed to the front side of plate-like rail support 21 lined up in a vertical direction. Further, rack 22 and travel rails 23 are fixed to rail support 21 at a position deviated in the lengthwise direction. That is, rack 22 and travel rails 23 are provided with protruding sections 221 and 231 that protrude from an end of rail support 21, and attachment section 211 at which rack 22 and travel rails 23 are not present is formed on the opposite side of rail support 21. Attachment section 211 is also formed on reference rail member 15 (refer to FIG. 4).

Accordingly, when additional rail member 17 is connected to rail member 15, as shown in FIG. 5, the end surfaces of rail support 21 contact each other, and protruding sections 221 and 231 of additional rail member 17 overlap with attachment section 211 of rail member 15. Also, connecting plate 25 is provided on additional rail member 17, with connecting plate 25 being secured by a fixing bolt contacting attachment section 211 of rail member 15. Connection of additional rail members 17 to each other uses a similarly configured connecting portion. With the present embodiment as described above, as shown in FIG. 5, connecting jig 18 is used when performing connection work of additional rail member 17.

To connect additional rail member 17, it is necessary to maintain additional rail member 17 in a horizontal state at the same height as rail member 15 of base 2A. Connecting jig 18 is used for this. Connecting jig 18 is an L-shaped plate with three leg members 37 attached to horizontal section 181 by screws, such that the height is adjustable. Also, brackets 31 and 32 for additional rail member 17 are secured to vertical section 182 of connecting jig 18 by fixing bolts. Connecting jig 18 is provided with multiple holes to make it lighter, to an extent that the required rigidity is maintained.

For additional rail member 17, brackets 31 and 32 for securing to additional base 2B are provided at four locations on the rear side of rail support 21. Each bracket 31 and 32 is joined such that horizontal plate 42 contacts vertical plate 41, and reinforcing block 43 is joined to horizontal plate 42 and vertical plate 41. Also, brackets 31 and 32 are secured to additional base 2B by fixing bolts 45 inserted into vertical plate 41, such that additional rail member 17 is attached to additional base 2B. However, because additional rail member 17 is positioned first, positional alignment of fixing bolts 45 and screw holes on the additional base 2B side is performed during arrangement work of additional base 2B, thus the burden on the operator remains large. Thus, with the present embodiment, such that arrangement can be performed without the need for fine adjustment of additional base 2B in order to connect it to additional rail member 17, the configuration is such that positional alignment of the fixing bolts with respect to the screw holes of base 32 is possible.

First, the left-right pair of brackets 31 arranged at the top level are fixed with respect to support block 47 by fixing bolts 48, and fixing bolts 48 are inserted in elongated holes that are elongated in the Z-axis direction formed in horizontal plate 42 of bracket 31. Then, support block 47 is secured to rail support 21 by fixing bolts that are not shown in the figures, with fixing bolts also inserted into elongated holes that are elongated in the X-axis direction formed in rail support 21. Further, elongated holes that are elongated in the Y-axis direction are formed in vertical plate 41, with fixing bolts 45 inserted into those elongated holes. Accordingly, via each elongated hole, support block 47 is adjustable in the X-axis direction with respect to rail support 21, bracket 31 is adjustable in the Z-axis direction with respect to support block 47, and fixing bolts 45 are adjustable in the Y-axis direction with respect to bracket 31.

On the other hand, left-right pair of brackets 32 arranged on the lower level are fixed to rail support 21 respectively via retainers 51. Retainer 51 is secured by fixing bolts 53 that pierce through rail support 21 from the rear side being engaged by nut 54 on the rear side. Elongated holes elongated in the X-axis direction, which are through-holes for fixing bolts 53, are formed in retainer 51. With bracket 32, elongated holes elongated in the Z-axis direction are formed in horizontal plate 42, and bracket 32 is secured to retainer 51 by fixing bolts 55 inserted in those elongated holes. Elongated holes elongated in the Y-axis direction are also formed in vertical plate 41 of bracket 32, and fixing bolts 45 are inserted in those elongated holes. Accordingly, via each elongated hole, retainer 51 is adjustable in the X-axis direction with respect to rail support 21, bracket 32 is adjustable in the Z-axis direction with respect to retainer 51, and fixing bolts 45 are adjustable in the Y-axis direction with respect to bracket 32.

Figure 8:
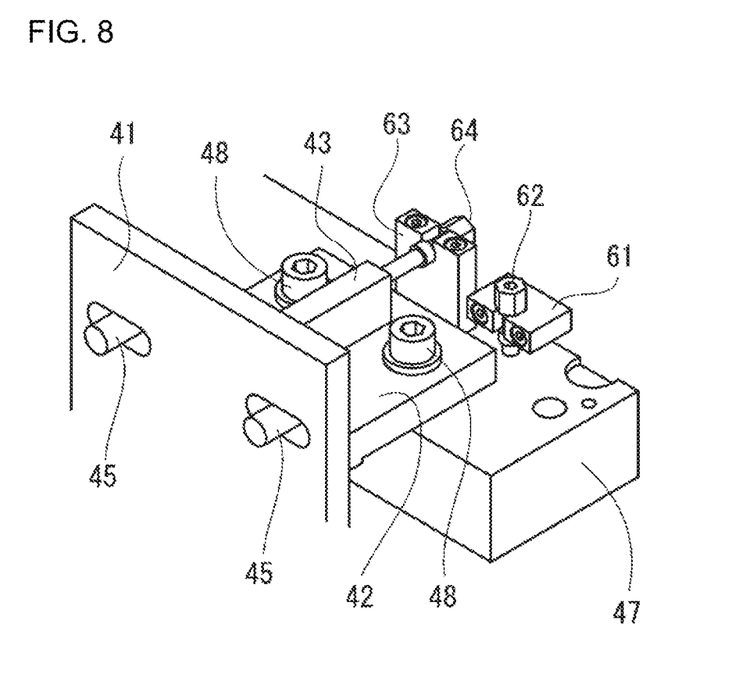
FIG. 8 is a perspective view of the bracket position adjusting mechanism.

Note that, a position adjustment mechanism capable of fine adjustment is provided on pair of left-right brackets arranged on the upper level. FIG. 8 is a perspective view of the bracket 31 position adjusting mechanism. First, base block 61 is fixed to rail support 21 protruding horizontally, and position adjusting bolt 62 is attached to base block 61 oriented vertically. The lower end of position adjusting bolt 62 engages with a female threaded section formed on support block 47. Base block 63 is fixed to support block vertically, and position adjusting bolt 64 is attached to base block 63 oriented horizontally. The tip end of position adjusting bolt 64 engages with a female threaded section formed on reinforcing block 43.

Position adjusting bolts 62 and 64 have the same configuration. A receiving groove is cut into the central end section of base blocks 61 and 63, and position adjusting bolts 62 and 64 are inserted into the groove to be capable of rotation but with restricted movement in the axis directions. By rotating position adjusting bolt 62 supported on base block 61, support block 47 moves in the X-axis direction, and by rotating position adjusting bolt 64 supported on base block 63, reinforcing block (bracket 31) moves in the Z-axis direction. Thus, fine adjustment required for positioning fixing bolts 45 is possible. With the present embodiment, a positioning adjustment mechanism is only provided on upper level brackets 31, but one may also be provided on lower level brackets 32. Note that, a position adjusting mechanism is not a required configuration.

With the base setting method of processing machine line 1, first base 2A provided with rail member 15 is arranged at a specified position, then additional rail member 17 is connected to that rail member 15. Additional rail member 17 is supported by connecting jig 18 and positioned at the same height as rail member 15. There, additional rail member 17 is connected to rail member 15. Protruding sections 221 and 231 of additional rail member 17 overlap attachment section 211 of rail member 15, and rail member 15 and additional rail member 17 are connected to each other by screws of connecting plate 25 and the like. Here, connection of rail member 15 and additional rail member 17 is performed such that no level difference occurs between respective racks 22 and travel rails 23.

After additional rail member 17 is connected to rail member 15, additional base 2B that is to support additional rail member 17 is arranged next to base 2A, and additional rail member 17 is fixed to that additional base 2B via brackets 31 and 32. Connecting jig 18 is removed when connecting additional rail member 17 to additional base 2B. Then, it is fine if fixing bolts 45 of brackets 31 and 32 are aligned with the screw holes of additional base 2B, otherwise, in a case in which they are not aligned, alignment of fixing bolts 45 in the X-axis direction (height direction), Z-axis direction (depth direction), and Y-axis direction (left-right direction) is performed as described above.

Brackets 31 and 32 are secured to additional base 2B by fixing bolts 45 that have been aligned, and with the attachment of additional rail member 17 to additional base 2B, arrangement of additional base 2B with respect to base 2A is complete. Then, another additional base 2B is arranged in processing machine line 1 as a third base. In this case too, first, the second additional rail member 17 is connected to the already attached first additional rail member 17 using connecting jig 18, then arrangement of another additional base 2B and fixing of the second additional rail member 17 to the second additional base 2B is performed. Note that, for arrangement of a third and onwards additional base 2B, the additional base to be arranged corresponds to the second base, and the already arranged additional base 2B corresponds to the first base.

Thus, according to the present embodiment, because additional rail member 17 is separated from additional base 2B, and work of connecting additional rail member 17 can be performed separately to arrangement work of additional base 2B, it is easy to perform base setting work of processing machine line 1. That is, because arrangement work of additional base 2B should be performed considering the arrangement of base 2A, the movement of additional base 2B during arrangement is made easy. Further, for the relationship between additional rail member 17 and additional base 2B, because only the position of fixing bolts 45 on the additional rail member 17 side need to be adjusted in the X-axis, Y-axis, and Z-axis directions, work of attaching additional rail member 17 to additional base 2B is extremely easy.

Also, the position adjusting mechanism for positioning fixing bolts 45 via brackets 31 and 32 attached to additional rail member 17 is configured simply from elongated holes elongated in the X-axis, Z-axis, and Y-axis directions that are formed in brackets 31 and 32. Accordingly, handling is easy and the above effects are achieved without cost. Further, for connection work of additional rail member 17, by using connecting jig 18, it is easy to perform connecting work of additional rail member 17 that must be connected at a specified height.

The above describes an embodiment of the present disclosure, but embodiments are not limited to these and various changes may be employed without departing from the scope of the disclosure.

For example, with processing machine line 1 of the above embodiment, base 2 is configured such that two machine tools 5 can be loaded, but the configuration may be such that one machine tool, or three or four machines tools can be loaded. The length of rail member 15 and additional rail member 17 should be formed to match the width of such a base 2.

REFERENCE SIGNS LIST

1: processing machine line; 2A: base; 2B: additional base; 3: processing module; 4: auto loader; 5: machine tool; 15: rail member; 17: additional rail member; 18: connecting jig; 23: travel rail; 31, 32: bracket; 45: fixing bolt

The invention claimed is:
1. A processing machine line, comprising:
a plurality of processing modules each configured to perform specified processing on a work;
a first base including first rails on a top side of the first base, at least one of the processing modules is loaded on the first rails to be moveable in an insertion direction;
a second base including second rails on a top side of the second base, at least another of the processing modules is loaded on the second rails to be moveable in the insertion direction;
an auto loader configured to transfer the work between the processing modules, the auto loader being movable along a front side of the first base and a front side of the second base which are respectively orthogonal to the top side of the first base and the top side of the second base, the auto loader including an articulated arm configured to grasp and release the work;
wherein the front side of the first base includes a first base rail member on which the auto loader travels that has a length to match a width of the first base, and
the front side of the second base includes a second base rail member on which the auto loader travels that has a length to match a width of the second base, the second base rail member configured to be attached to and removed from the front side of the second base adjacent to the first base.

2. The processing machine base construction according to claim 1, wherein
the second rail member includes a bracket configured to fasten the second rail member to the second base by way of a base fixing bolt, the bracket including a position adjusting mechanism that adjusts a position of the base fixing bolt in a height direction, a depth direction, and a left-right direction.

3. The processing machine base construction according to claim 2, wherein
the second rail member is configured such that the bracket is attached to the second base, and the position adjustment mechanism includes a fastening section provided with multiple fixing bolt through-holes arranged at a specified location from the second base between the base fixing bolts, the through-holes formed from an elongated hole elongated in the height direction, depth direction, or left-right direction.

4. The processing machine base construction according to claim 1, wherein the first rail member and the second rail member are aligned so that the auto loader travels along both the first rail member and the second rail member.

5. The processing machine base construction according to claim 1, wherein the auto loader includes a slider that grips and slides along both the first rail member and the second rail member.

6. The processing machine base construction according to claim 1, wherein the first rail member and the second rail member are aligned so that the auto loader travels between the first rail member and the second rail member.

* * * * *